(12) United States Patent
Yang et al.

(10) Patent No.: US 12,446,337 B2
(45) Date of Patent: Oct. 14, 2025

(54) PIXEL STRUCTURE AND IMAGE SENSOR INCLUDING A NANO ANTENNA UNIT

(71) Applicant: Huawei Technologies Co., Ltd., Guangdong (CN)

(72) Inventors: Liang Yang, Beijing (CN); Yongjun Liu, Beijing (CN); Hui Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 708 days.

(21) Appl. No.: 17/663,284

(22) Filed: May 13, 2022

(65) Prior Publication Data

US 2022/0278145 A1  Sep. 1, 2022

Related U.S. Application Data

(63) Continuation of application No. PCT/CN2020/128425, filed on Nov. 12, 2020.

(30) Foreign Application Priority Data

Nov. 14, 2019  (CN) .......................... 201911110638.X

(51) Int. Cl.
*H10F 30/22* (2025.01)
*H10F 39/00* (2025.01)

(52) U.S. Cl.
CPC ........... *H10F 39/802* (2025.01); *H10F 30/22* (2025.01)

(58) Field of Classification Search
CPC ......... H01L 27/14603; H01L 27/14605; H01L 27/14625; H01L 27/1469; H01L 27/14609;

(Continued)

(56) References Cited

U.S. PATENT DOCUMENTS 10,084,239 B2 *  9/2018  Shaver ................. H01Q 19/104
10,856,789 B2 * 12/2020  Soliman ............... A61B 5/1459
(Continued)

FOREIGN PATENT DOCUMENTS

CN     101459185 A     6/2009
CN     101714837 A     5/2010
(Continued)

OTHER PUBLICATIONS

Butet, J., and Martin, O. J. (2015). Manipulating the optical bistability in a nonlinear plasmonic nanoantenna array with a reflecting surface. Plasmonics, 10(1), 203-209.

(Continued)

*Primary Examiner* — Ida M Soward
(74) *Attorney, Agent, or Firm* — WOMBLE BOND DICKINSON (US) LLP

(57) ABSTRACT

A pixel structure and an image sensor are provided, to improve photoelectric conversion efficiency under a weak light condition and resolve a problem that an image generated in weak light is dim. The pixel structure includes a metallic ground plane, and a substrate unit cell located on the metallic ground plane. The pixel structure further includes a nano antenna unit that is located on the substrate unit cell and that includes one or more nano antennas, each of the one or more nano antennas corresponding to one optical band and including M parts A nano gap is formed between the M parts, a metal-insulator-metal diode is formed at the nano gap, and M is a multiple of 2. The pixel structure further includes a packaging unit that covers the nano antenna unit. The image sensor includes a plurality of pixel structures.

19 Claims, 8 Drawing Sheets

(58) Field of Classification Search
CPC ....... H01L 31/02; H01L 23/66; H01Q 1/2266; H01Q 1/243; H01Q 1/38; H01Q 13/106; H01Q 1/22; H01Q 21/30; H10F 39/802; H10F 39/8023; H10F 39/806; H10F 39/803; H10F 30/22

See application file for complete search history.

(56) References Cited

U.S. PATENT DOCUMENTS

| | | | |
|---|---|---|---|
| 10,978,779 B2* | 4/2021 | Maggay | H01Q 9/0407 |
| 11,442,198 B2* | 9/2022 | Boriskin | G02B 27/4205 |
| 2011/0062334 A1 | 3/2011 | Ben-Bassat | |
| 2011/0194100 A1 | 8/2011 | Thiel et al. | |
| 2012/0091365 A1* | 4/2012 | Moerner | G01N 21/64 |
| | | | 250/200 |
| 2014/0226021 A1 | 8/2014 | Koechlin et al. | |
| 2018/0190688 A1 | 7/2018 | Han et al. | |
| 2019/0064532 A1* | 2/2019 | Riley, Jr. | G02B 27/0927 |

FOREIGN PATENT DOCUMENTS

| | | | | |
|---|---|---|---|---|
| CN | 101846622 A | | 9/2010 | |
| CN | 102103224 A | | 6/2011 | |
| CN | 102203949 A | | 9/2011 | |
| CN | 103930755 A | | 7/2014 | |
| CN | 104319471 A | * | 1/2015 | ............... H01Q 1/38 |
| CN | 104966745 A | | 10/2015 | |
| CN | 106373968 A | * | 2/2017 | ............ H10F 19/75 |
| CN | 106940296 A | | 7/2017 | |
| CN | 104966745 B | * | 8/2017 | ............ H10F 10/00 |
| CN | 109040620 A | | 12/2018 | |
| CN | 109564323 A | | 4/2019 | |
| CN | 110085610 A | | 8/2019 | |
| CN | 110444557 A | | 11/2019 | |
| WO | WO-2010010562 A2 | * | 1/2010 | ............ H02J 50/005 |
| WO | 2018163167 A1 | | 9/2018 | |

OTHER PUBLICATIONS

Gaojie, Ultra-high-efficiency nano-antenna solar cells, 2008, 1 page (abstract).
Nakamura, J. (Ed.). (2016). Image sensors and signal processing for digital still cameras. CRC press.
Ghenuche, P., Cherukulappurath, S., Taminiau, T. H., van Hulst, N. F., and Quidant, R. (2008). Spectroscopic mode mapping of resonant plasmon nanoantennas. Physical review letters, 101(11), 116805.
Choi, K., Yesilkoy, F., Ryu, G., Cho, S. H., Goldsman, N., Dagenais, M., and Peckerar, M. (2011). A focused asymmetric metal insulator metal tunneling diode: fabrication, DC characteristics and RF rectification analysis. IEEE Transactions on Electron Devices, 58(10), 3519-3528.
Miskovsky, N. M., Cutler, P. H., Mayer, A., Weiss, B. L., Willis, B., Sullivan, T. E., and Lerner, P. B. (2012). Nanoscale devices for rectification of high frequency radiation from the infrared through the visible: a new approach. Journal of Nanotechnology, 2012.
Zhao, H., Gao, H., and Li, B. (2019). Theory and method for large electric field intensity enhancement in the nanoantenna gap. Applied optics, 58(3), 670-676.
Zhuang, C., Wang, L., Dai, Z., and Yang, D. (2015). High frequency Ni—NiO—Ag metal-insulator-metal tunnel diodes fabricated via anodic aluminum oxide templates. ECS Solid State Letters, 4(5), p. 39-p. 42.
Torrey, H. C., and Whitmer, C. A. (1948). Crystal rectifiers.
Matyi G: "Nanoantennas for uncooled, double band, CMOS compatible, high-speed infrared sensors", International Journal of C Cuit Theoryand Applications, Chichester, GB, vol. 32, No. 5, May 10, 2004 (May 10, 2004), pp. 425-430, XP002547369, DOI:10.1002/CTA.289 [retrieved on Sep. 6, 2004].
Fumeaux Christophe et al: "Lithographic antennas at visible frequencies", Optics Letters, vol. 24, No. 22, Nov. 15, 1999 (Nov. 15, 1999), p. 1629, XP055981333, US ISSN:0146-9592, DOI:10.1364/0L.24.001629 Retrieved from the Internet: U RL:https://pages.charlotte.edu/glenn boreman/wp-content/ uploads/sites/146/2014/06/Fumeaux_ OL_24_1999.pdf.
Wilke I. et al: "Nanometer thin-film Ni—NiO—Ni diodes for 30 THz radiation", Applied Physics A. Solids and Surfaces. vol. 58, No. 4, Apr. 1, 1994 (Apr. 1, 1994) pp. 329-341 XP055981335, DE ISSN:0721 7250, DOI:10.1007/BF00323606 Retrieved from the Internet: URL:https://link.springer.com/content/pdf/10.1007/BF00323606.pdf.
Wang Kai et al: "Design of a sector bowtie nano rectenna for optical power and infrared detection", Frontiers of Physics, Higher Education Press, Beijing, vol. 10, No. 5, Oct. 29, 2015 (Oct. 29, 2015), pp. 1 12, XP035576866, ISSN:2095-0462, DOI:10.1007/S 11467-015-0508-7 [retrieved on Oct. 29, 2015].
Gadalla M. N. et al: "Design, Optimization and Fabrication of a 28.3 THz Nano-Rectenna for Infrared Detection and Rectification" Scientific Reports, vol. 4, No. 1, Mar. 6, 2014 (Mar. 6, 2014), XP093099158, total 9 pages.

* cited by examiner

PIXEL STRUCTURE AND IMAGE SENSOR INCLUDING A NANO ANTENNA UNIT

CROSS-REFERENCE TO RELATED APPLICATIONS

This application is a continuation of International Application No. PCT/CN2020/128425, filed on Nov. 12, 2020, which claims priority to Chinese Patent Application No. 201911110638.X, filed on Nov. 14, 2019. The disclosures of the aforementioned applications are hereby incorporated by reference in their entireties.

TECHNICAL FIELD

This application relates to the field of electronic technologies, and in particular, to a pixel structure and an image sensor.

BACKGROUND

An image sensor is capable of converting an optical signal into an electrical signal, and is one of core parts of a mobile phone camera. Currently, image sensors applied on the market mainly include a charge coupled device (CCD) image sensor and a complementary metal oxide semiconductor (CMOS) image sensor. Both image sensors essentially utilize a particle nature of light and let photons excite free electrons in a semiconductor to generate an electrical signal. Under a weak light condition, a few photons can be captured by a camera. As a result, an electrical signal generated through photographing at night is weak, and a photo taken by a mobile phone at night appears dim.

SUMMARY

This application provides a pixel structure and an image sensor, to improve photoelectric conversion efficiency under a weak light condition and resolve a problem that an image generated in weak light is dim.

According to a first aspect, a pixel structure is provided, including: a metallic ground plane; a substrate unit cell, where the substrate unit cell is located on the metallic ground plane; a nano antenna unit, where the nano antenna unit is located on the substrate unit cell, the nano antenna unit includes one or more nano antennas, each of the one or more nano antennas corresponds to one optical band, each nano antenna includes M parts, a nano gap is formed between the M parts, the M parts and the nano gap have a function of a metal-insulator-metal diode, and M is a multiple of 2; and a packaging unit, where the packaging unit covers the nano antenna unit.

According to the Pauli exclusion principle, each orbit can accommodate only two electrons with opposite spin directions. Therefore, when the orbit is occupied, some photons cannot participate in photoelectric conversion. The Pauli exclusion principle is a fundamental law that cannot be changed, and light has wave-particle duality. Therefore, photoelectric conversion efficiency can be improved from a perspective of waves. In this embodiment of this application, an enhanced light field is formed at the nano gap of the nano antenna, and a structure that has a function of a metal-insulator-metal diode and that is formed at the nano gap by the M parts and the nano gap is exactly located in the enhanced light field. The structure with a function of a metal-insulator-metal diode performs photoelectric conversion in the enhanced light field, thereby improving photoelectric conversion efficiency under a weak light condition and resolving a problem that an image generated in weak light is dim.

With reference to the first aspect, in an embodiment, each of the M parts and a part adjacent to the part have different work functions.

Each part of the M parts, a part adjacent to the part, and a nano gap form a structure with a function of a metal-insulator-metal diode at the nano gap. Because each part and a part adjacent to the part have different work functions, electron tunneling occurs in the nano gap, and a function of a tunneling diode is achieved. Therefore, the structure with a function of a metal-insulator-metal diode can serve as a rectifier to convert an alternating current generated at the nano gap into a direct current.

With reference to the first aspect, in an embodiment, each of the M parts and a part adjacent to the part are different metals in a same shape, a same metal in different shapes, or different metals in different shapes. In this way, each part and a part adjacent to the part can have different work functions.

With reference to the first aspect, in an embodiment, a width of each of the M parts progressively decreases from a location away from the nano gap to a location close to the nano gap.

Because a metal-insulator-metal diode operates at an optical frequency, a cut-off frequency of the metal-insulator-metal diode needs to be increased to make the metal-insulator-metal diode reach the optical frequency. To increase the cut-off frequency of the metal-insulator-metal diode, a capacitance value of the metal-insulator-metal diode needs to be reduced. A width of a metal antenna around the structure with a function of a metal-insulator-metal diode may be reduced to achieve an effect of reducing a capacitance value of the metal-insulator-metal diode.

With reference to the first aspect, in an embodiment, a parameter of the substrate unit cell at a location of each nano antenna corresponds to an optical band corresponding to the nano antenna, and the parameter of the substrate unit cell includes a thickness and a dielectric constant.

When light is irradiated to a surface of the nano antenna, some light waves pass through the nano antenna and cannot be fully absorbed by the nano antenna. In this embodiment of this application, the light waves that pass through the nano antenna are reflected back to the nano antenna by the substrate unit cell with a specific parameter, thereby improving light absorption efficiency of the nano antenna.

With reference to the first aspect, in an embodiment, the nano antenna includes N antenna pairs, each of the N antenna pairs includes two parts, there is a nano gap between the two parts, the N antenna pairs are radially arranged and are parallel to the substrate unit cell, the radial arrangement includes any one of a linear shape, a cross shape, and a double-cross shape, and N is an integer greater than or equal to 1.

Theoretically, an optimal antenna shape should follow a polarization direction of a light wave. However, light in nature is polarized in random directions. However, light can always be decomposed into two polarization components along an x direction and a y direction regardless of a polarization direction. A linear-shaped antenna can perform photoelectric conversion on a light wave whose polarization direction follows the linear shape. A cross-shaped antenna and a double-cross-shaped antenna can decompose light waves polarized in random directions into components along different parts of the antenna, to perform photoelectric conversion on the light waves in random polarization directions.

With reference to the first aspect, in an embodiment, each part of the N antenna pairs is in a strip shape.

With reference to the first aspect, in an embodiment, the nano antenna includes two parts, the two parts are arranged in a bow-tie shape and are parallel to the substrate unit cell, there is a nano gap between the two parts, each of the two parts is in a trapezoidal shape, and the trapezoids are arranged with shortest bases facing each other.

For any points on a lateral side of a trapezoid, distances from the points to a long base of the trapezoid continuously and successively change. In other words, it may be considered that lengths of the nano antenna continuously and successively change. Therefore, the nano antenna can perform photoelectric conversion on light waves within a continuous wavelength range, thereby expanding a range of photoelectric conversion performed by the nano antenna.

In an embodiment, bases of the two parts of the nano antenna at the nano gap may be alternatively in an arc shape protruding toward the nano gap.

With reference to the first aspect, in an embodiment, the nano antenna includes two parts, one of the two parts is vertically disposed on the substrate unit cell, the other of the two parts is arranged facing the one of the two parts, and there is a nano gap between the one of the two parts and the other of the two parts.

With reference to the first aspect, in an embodiment, the part vertically disposed on the substrate unit cell is in a cone shape, and a size of the cone is greater than that of the other of the two parts that is arranged facing the cone.

A lower part of the nano antenna is disposed on the substrate unit cell with its long side perpendicular to the substrate unit cell, thereby reducing an area occupied on the substrate unit cell. Therefore, this type of nano antenna may be disposed on the substrate unit cell to increase antenna density. In an embodiment, all of the plurality of nano antennas may have different sizes, thereby expanding a range of photoelectric conversion.

With reference to the first aspect, in an embodiment, an electrode line of the nano antenna is arranged at a location, close to the nano gap, of each of the M parts.

The metal-insulator-metal diode converts an alternating current into a direct current. Because a metal part of the nano antenna has a relatively large resistance, the electrode line of the nano antenna may be arranged at a location close to the metal-insulator-metal diode to reduce a current loss in the metal part, thereby improving photoelectric conversion efficiency.

According to a second aspect, an image sensor is provided, including a plurality of pixel structures according to any one of the implementations of the foregoing aspect.

According to a third aspect, a camera is provided, including the pixel structure and/or the image sensor according to any one of the implementations of any one of the foregoing aspects.

According to a fourth aspect, an electronic product is provided, including the pixel structure and/or the image sensor and/or the camera according to any one of the implementations of any one of the foregoing aspects.

DESCRIPTION OF EMBODIMENTS

The following describes technical solutions in embodiments of this application with reference to accompanying drawings.

For ease of understanding embodiments of this application, several nouns used in this application are briefly described first.

1. Pixel

A pixel is a minimum photosensitive unit on an image sensor of a mobile phone camera.

2. Diode

A diode is an apparatus with two electrodes in an electronic element, and allows a current to pass only in one direction. A rectification function of the diode is applied in many practices.

3. Analog-to-Digital Converter

An analog-to-digital converter is usually an electronic element that converts an analog signal into a digital signal. A typical analog-to-digital converter converts an input voltage signal into an output digital signal. The digital signal has no practical meaning, and only indicates a relative magnitude. Therefore, any analog-to-digital converter needs a reference analog quantity as a conversion standard. A common reference standard is a maximum size of a convertible signal. An output digital quantity indicates a magnitude of an input signal with respect to a reference signal.

4. Light Filter

Alight filter is an optical device capable of selectively transmitting a part of a spectrum while rejecting to transmit a remaining part.

5. Nano Antenna

An antenna is a device that performs conversion between an alternating current and an electromagnetic wave. Light may be considered as an electromagnetic wave, and a nano antenna is a nano-scale optical antenna.

6. Work Function

A work function indicates minimum energy that needs to be provided to enable an electron to immediately escape from a surface of a solid.

A pixel structure provided in embodiments of this application may be applied to an electronic device with a photographing function, for example, a mobile phone, a tablet computer, or a wearable device. A specific type of the electronic device is not limited in embodiments of this application.

Figure 1:
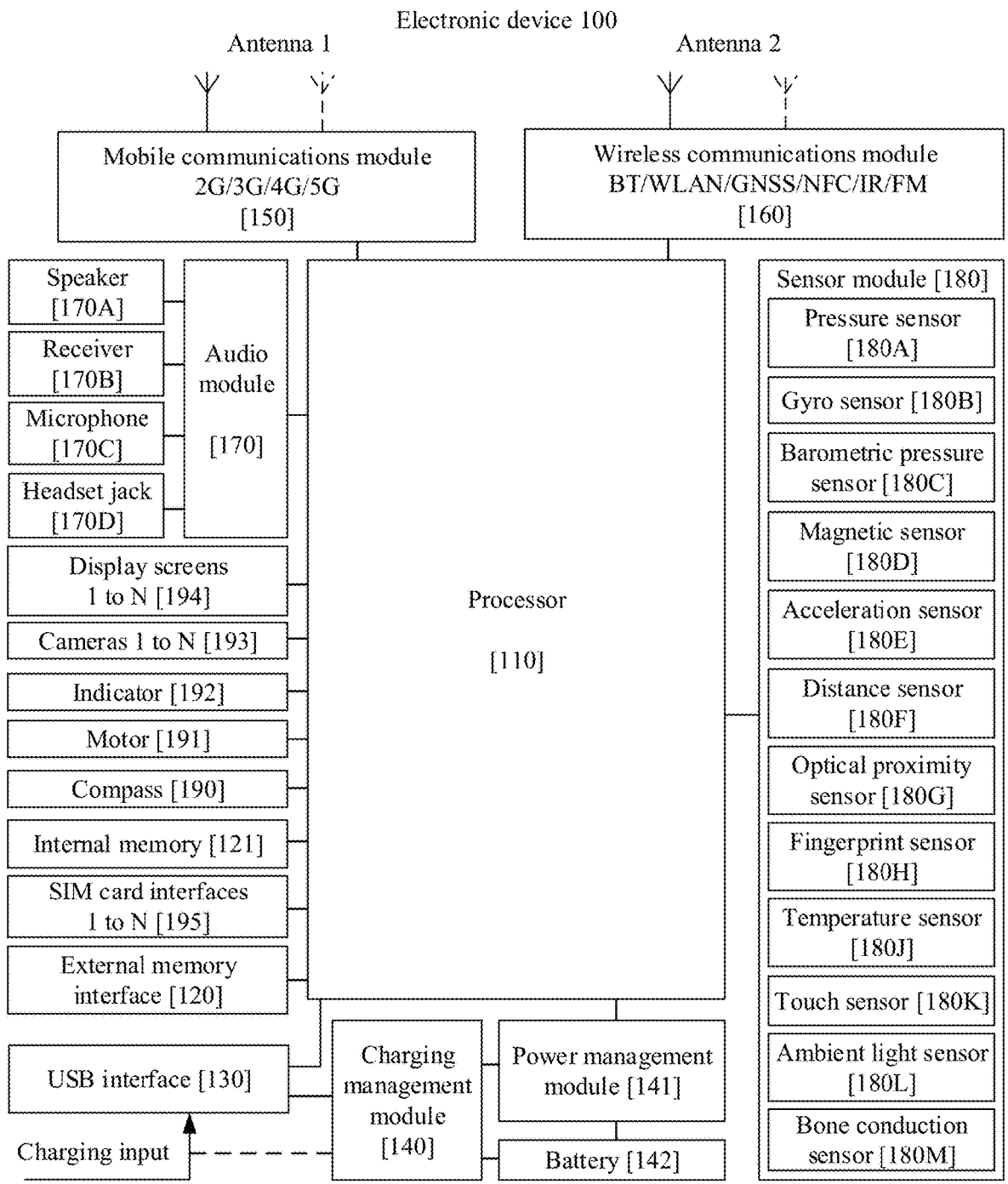
FIG. 1 is a schematic diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that an example structure in this embodiment of this application does not constitute a specific limitation on the electronic device 100. In some other embodiments of this application, the electronic device 100 may include components more or fewer than those shown in the figure, or some components may be combined, or some components may be split, or there may be a different component arrangement. The components shown in the figure may be implemented through hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural processing unit (NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

The memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the instructions or the data may be invoked directly from the memory. This avoids repeated access and reduces a waiting time of the processor 110, thereby improving efficiency of the system.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 110 may include a plurality of groups of I2C buses. The processor 110 may be coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be used to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call by using a Bluetooth headset.

The PCM interface may also be used to perform audio communication, and sample, quantize, and code an analog signal. In some embodiments, the audio module 170 may be coupled to the wireless communication module 160 through the PCM bus interface. In some embodiments, the audio module 170 may alternatively transmit an audio signal to the wireless communication module 160 through the PCM interface, to implement a function of answering a call by using a Bluetooth headset. Both the I2S interface and the PCM interface may be used to perform audio communication.

The UART interface is a universal serial data bus, and is used to perform asynchronous communication. The bus may be a two-way communication bus, and converts to-be-transmitted data between serial communication and parallel communication. In some embodiments, the UART interface is usually used to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured through software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may be alternatively configured as the I2C interface, the I2S interface, the UART interface, the MIPI interface, or the like.

The USB interface 130 is an interface that conforms to a USB standard specification, and may be a mini USB interface, a micro USB interface, a USB type-C interface, or the like. The USB interface 130 may be configured to connect to a charger to charge the electronic device 100, may be configured to transmit data between the electronic device 100 and a peripheral device, or may be used to connect to a headset for playing audio through the headset. Alternatively, the interface may be used to connect to another electronic device, for example, an AR device.

It may be understood that an interface connection relationship between modules illustrated in this embodiment of this application is merely an example for description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive a charging input from the charger. The charger may be a wireless charger or a wired charger. The power management module 141 is configured to connect the battery 142 and the charging management module 140 to the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may be alternatively disposed in the processor 110. In some other embodiments, the power management module 141 and the charging management module 140 may be alternatively disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. The mobile communication module 150 may provide a solution that is applied to the electronic device 100 and that includes wireless communication technologies such as 2G, 3G, 4G, and 5G.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, or the like and that is applied to the electronic device 100.

The electronic device 100 implements a display function by using the graphics processing unit (GPU), the display 194, the application processor, and the like. The GPU is a microprocessor for image processing, and is connected to the display 194 and the application processor. The GPU is configured to: perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The electronic device 100 may implement a photographing function by using the image signal processor (ISP), the camera 193, the video codec, the GPU, the display 194, the application processor, and the like. In this application, the camera 193 may be an optical zoom lens or the like. This is not limited in this application.

In some embodiments, the ISP may be disposed in the camera 193. This is not limited in this application.

The camera 193 is configured to capture a static image or a video. An optical image of an object is generated by using a lens, and is projected onto the photosensitive element. In this embodiment of this application, the photosensitive element is an image sensor. The image sensor converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more types of video codecs. In this way, the electronic device 100 can play or record videos in a plurality of encoding formats, for example, moving picture experts group (MPEG)-1, MPEG-2, MPEG-3, MPEG-4, and the like.

The NPU is a neural-network (NN) computing processor, quickly processes input information by referring to a structure of a biological neural network, for example, by referring to a mode of transmission between human brain neurons, and may further continuously perform self-learning. The NPU may implement applications such as intelligent cognition of the electronic device 100, for example, image recognition, facial recognition, speech recognition, text comprehension, and the like.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external memory card.

The internal memory 121 may be configured to store computer-executable program code, and the executable-program code includes instructions. The processor 110 performs various functional applications and data processing of the electronic device 100 by running the instructions stored in the internal memory 121. The internal memory 121 may include a program storage area and a data storage area. The program storage area may store an operating system, an application required by at least one function (for example, a voice playing function or an image playing function), and the like. The data storage area may store data (for example, audio data, a phone book, and the like) created in a process of using the electronic device 100, and the like. In addition, the internal memory 121 may include a high-speed random access memory, or may include a nonvolatile memory, for example, at least one magnetic disk storage device, a flash memory, or a universal flash storage (UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules of the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When the electronic device 100 is configured to answer a call or listen to voice information, the receiver 170B may be placed close to a human ear to listen to a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to implement a noise reduction function, in addition to collecting an audio signal. In some other embodiments, three, four, or more microphones 170C may be alternatively disposed in the electronic device 100, to collect an audio signal and reduce noise. The microphones may further identify a sound source, implement a directional recording function, and the like.

The headset jack 170D is configured to connect to a wired headset. The headset jack 170D may be a USB interface 130, or may be a 3.5 mm open mobile terminal platform (OMTP) standard interface or cellular telecommunication industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure strength based on a change of the capacitance. When a touch operation acts on the display 194, the electronic device 100 detects strength of the touch operation by using the pressure sensor 180A. The electronic device 100 may also calculate a touch position based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an application icon "Messages", an instruction for viewing an SMS message is executed. When a touch operation whose touch operation intensity is greater than or equal to the first pressure threshold is performed on an application icon "Messages", an instruction for creating an SMS message is executed.

The gyro sensor 180B may be configured to determine a motion posture of the electronic device 100. In some embodiments, an angular velocity of the electronic device 100 around three axes (namely, an x-axis, a y-axis, and a z-axis) may be determined by using the gyro sensor 180B. The gyroscope sensor 180B may be configured to implement image stabilization during photographing. For example, when a shutter is pressed, the gyro sensor 180B detects an angle at which the electronic device 100 shakes, and calculates, based on the angle, a distance for which a lens module needs to compensate, so that the lens cancels the shake of the electronic device 100 through reverse motion, thereby implementing the image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening/closing of a clamshell leather case by using the magnetic sensor 180D. In some embodiments, when the electronic device 100 is a clamshell phone, the electronic device 100 may detect opening/closing of the clamshell by using the magnetic sensor 180D. Further, a feature such as automatic unlocking upon opening of the flip cover is set based on a detected opening or closing state of the leather case or a detected opening or closing state of the flip cover.

The acceleration sensor 180E may detect a magnitude of an acceleration of the electronic device 100 in each direction (usually, three axes). When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance through infrared or laser. In some embodiments, in a photographing scenario, the electronic device 100 may measure a distance by using the distance sensor 180F, to implement fast focusing.

The optical proximity sensor 180G may include, for example, a light-emitting diode (LED) and an optical detector such as a photodiode. The light-emitting diode may be an infrared light-emitting diode. The electronic device 100 emits infrared light by using the light emitting diode. The electronic device 100 detects, by using the photodiode, infrared reflected light that comes from a nearby object. When detecting sufficient reflected light, the electronic device 100 may determine that there is an object near the electronic device 100; or when detecting insufficient reflected light, the electronic device 100 may determine that there is no object near the electronic device 100. The electronic device 100 may detect, by using the optical proximity sensor 180G, that the user holds the electronic device 100 close to an ear for a call, to automatically turn off a screen to save power. The optical proximity sensor 180G may also be used in a leather case mode or a pocket mode to automatically unlock or lock the screen.

The ambient light sensor 180L is configured to sense ambient light brightness. The electronic device 100 may adaptively adjust luminance of the display 194 based on the sensed luminance of the ambient light. The ambient light sensor 180L may also be configured to automatically adjust a white balance during photographing. The ambient light sensor 180L may further cooperate with the optical proximity sensor 180G to detect whether the electronic device 100 is in a pocket, to prevent a false touch.

The fingerprint sensor 180H is configured to collect a fingerprint. The electronic device 100 may use a feature of the collected fingerprint to implement fingerprint-based unlocking, unlocking for application access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is lower than another threshold, the electronic device 100 heats up the battery 142, to avoid abnormal shutdown of the electronic device 100 due to the low temperature. In some other embodiments, when the temperature is lower than still another threshold, the electronic device 100 boosts an output voltage of the battery 142 to avoid abnormal shutdown due to the low temperature.

The touch sensor 180K may also be referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may be alternatively disposed on a surface of the electronic device 100, and is at a position different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, and receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The key 190 includes a power key, a volume key, and the like. The key 190 may be a mechanical key, or may be a touch key. The electronic device 100 may receive key input, and generate key signal input related to user settings and function control of the electronic device 100.

The motor 191 may generate a vibration prompt. The motor 191 may be configured to produce an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is used to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is applicable to different types of SIM cards. The SIM card interface 195 is also applicable to an external storage card. The electronic device 100 interacts with a network by using the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

Figure 2:
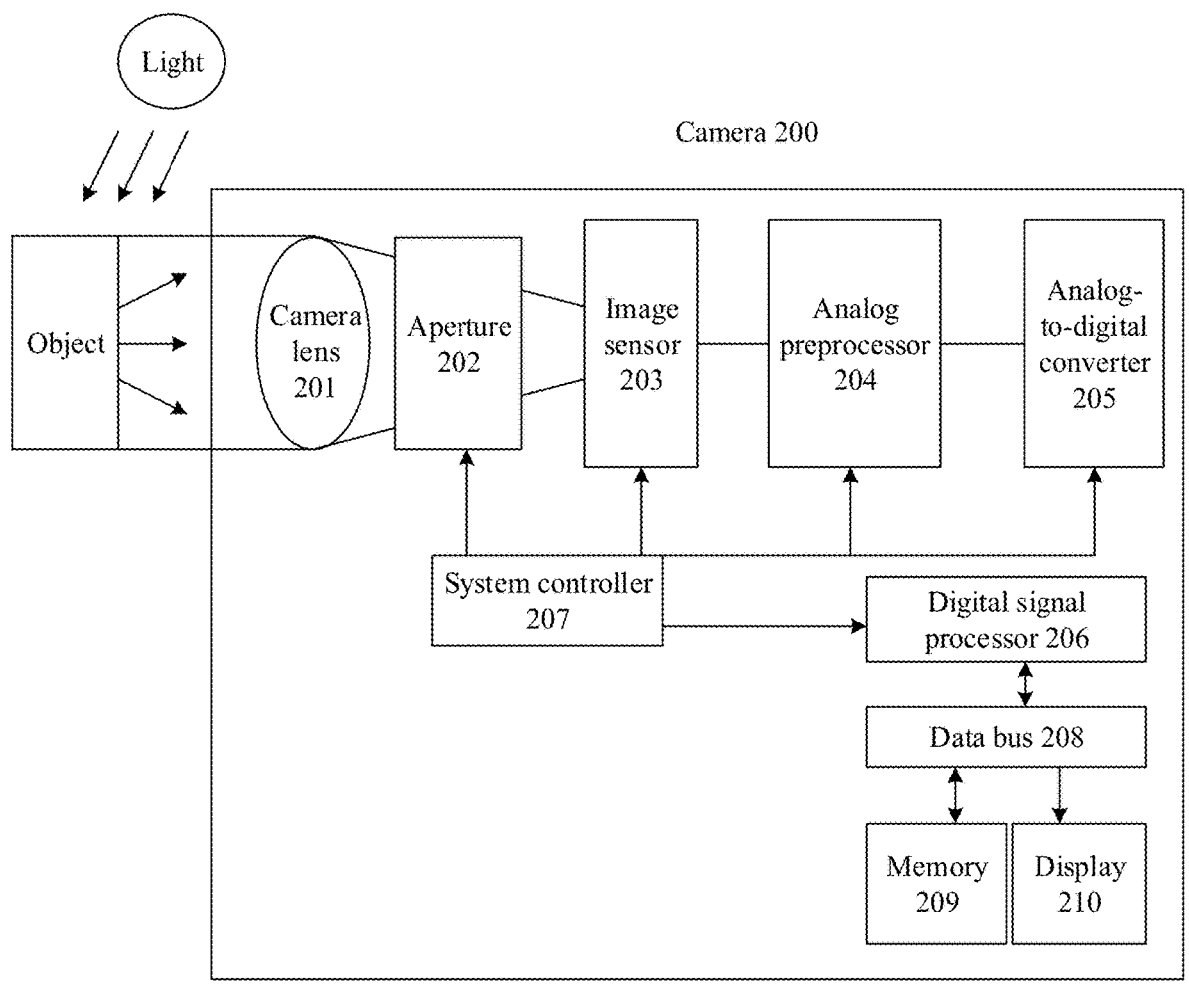
FIG. 2 is a schematic diagram of a structure of a camera according to an embodiment of this application.

FIG. 2 is a schematic diagram of a structure of a camera 200. The camera 200 may be disposed in the electronic device 100 in FIG. 1, to implement a function of the camera 193. The camera 200 includes a camera lens 201, an aperture 202, an image sensor 203, an analog preprocessor 204, an analog-to-digital sensor 205, a digital signal processor 206, a system controller 207, a data bus 208, a memory 209, a display 210, and the like.

It should be understood that the structure shown in this embodiment of this application does not constitute a specific limitation on the camera 200. In some other embodiments of this application, the camera 200 may include more or fewer components than those shown in the figure, or some components may be combined, or some components may be split, or there may be a different component arrangement. The components shown in the figure may be implemented through hardware, software, or a combination of software and hardware.

It should be further understood that the structure shown in this embodiment of this application does not constitute a specific limitation on a function of the camera 200. The function of the camera 200 includes implementing a function of an existing camera, and is not limited to a function such as photographing or video recording.

The camera lens 201 is a device for generating an image of a photographed object on the sensor, performs a light focusing function, and may include several lenses.

The aperture 202 is an apparatus for controlling light that passes through the camera lens to reach the sensor. In addition to controlling a luminous flux, the aperture 202 further has a function of controlling a depth of field. The depth of field is a range of distances in front and rear of a photographed object that are measured when the camera lens can obtain a clear image through imaging. A larger aperture indicates a smaller depth of field.

The image sensor 203 is an apparatus configured to receive light that passes through the camera lens and convert these optical signals into electrical signals. In this embodiment of this application, the image sensor 203 includes a pixel structure that is obtained by integrating a nano antenna and a metal-insulator-metal sensor.

An electrical signal generated by the image sensor 203 is an analog direct current signal. The analog preprocessor 204 preprocesses the analog direct current signal. The preprocessing includes noise reduction processing, correction processing, compensation processing, and the like.

The analog-to-digital converter 205 is configured to convert a preprocessed analog direct current signal into a digital signal.

The digital signal is transmitted to the digital signal processor 206 for processing.

The system controller 207 controls the aperture 202, the image sensor 203, the analog preprocessor 204, and the analog-to-digital converter 205.

A processed digital signal is transmitted to the memory 209 or the display 210 through the data bus 208. As an example rather than a limitation, the memory 209 may be a photo memory, such as a gallery, of the electronic device in FIG. 1, and the display 210 may be the display 194 in FIG. 1 or the like.

Figure 3:
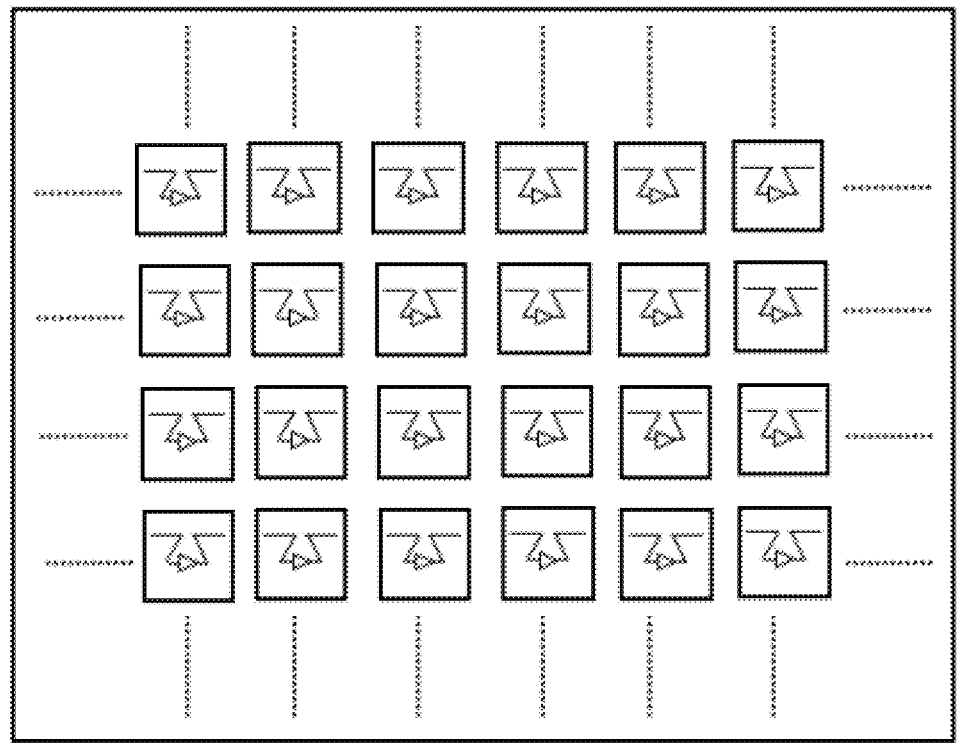
FIG. 3 is a schematic diagram of a structure of an image sensor according to an embodiment of this application.

FIG. 3 is a schematic diagram of a structure of an image sensor according to an embodiment of this application. The image sensor may be the image sensor 203 in FIG. 2, and may implement all functions of the image sensor 203. The image sensor is a pixel array and includes a plurality of pixel structures. Dashed lines indicate pixel structures that are not shown. Each pixel structure has a nano antenna unit. The nano antenna unit includes one or more nano antennas. A response of the nano antenna to light depends on a proportional relationship between a size of the nano antenna and a wavelength of the light. Therefore, each pixel structure can absorb light of different colors depending on selectivity of the nano antenna for a light wavelength, without disposing a filter structure. It can be learned from the foregoing description that the image sensor includes nano antennas with L sizes. In this case, the image sensor can absorb light with L different wavelengths, where L is an integer greater than or equal to 3.

Figure 4:
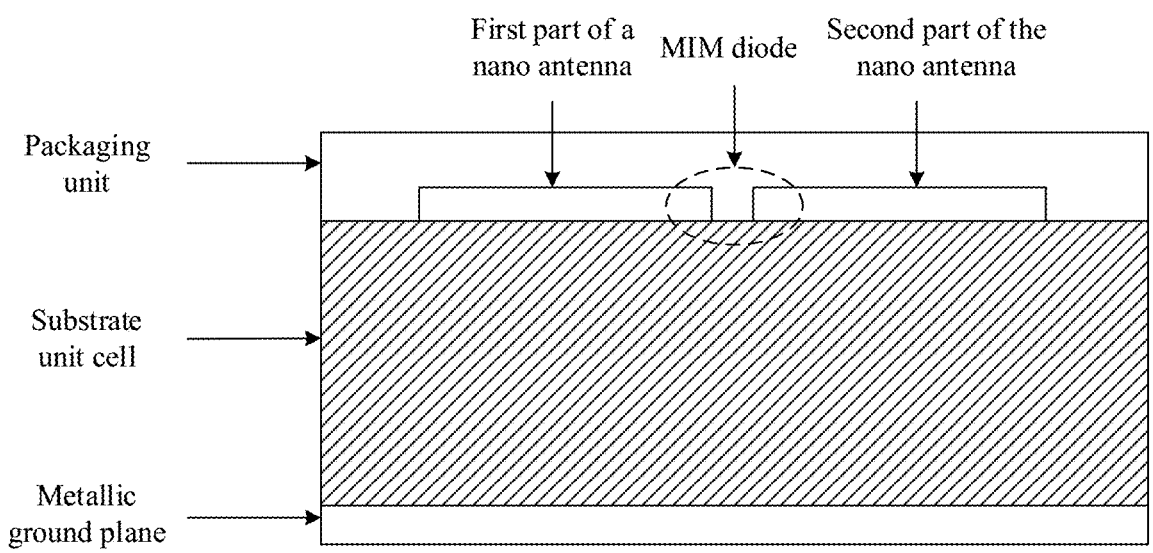
FIG. 4 is a schematic diagram of a structure of a pixel structure according to an embodiment of this application.

FIG. 4 is a schematic diagram of a pixel structure according to an embodiment of this application.

The pixel structure shown in FIG. 4 includes parts such as a metallic ground plane, a substrate unit cell, a nano antenna unit, and a packaging unit.

The metallic ground plane is located at a bottom layer of the entire pixel structure, and a capacitor is formed between the metallic ground plane and a metal nano antenna. The metallic ground plane may be made of aluminum. Optionally, the metallic ground plane may be alternatively made of a noble metal with higher costs, for example, gold, silver, or platinum, and has a better conductive effect. This is not limited in this embodiment of this application.

The nano antenna unit may include one or more nano antennas, and each nano antenna includes a plurality of parts. A nano antenna in FIG. 4 is used as an example. The nano antenna includes a first part and a second part. Both the first part and the second part of the nano antenna are made of a metal. The first part and the second part of the nano antenna have different work functions. For example, the first part and the second part may be made of a same metal but have different shapes; or the first part and the second part may be made of different metals but have a same shape; or the first part and the second part may be made of different metals and also have different shapes. Optionally, the metal may be any two of gold, silver, aluminum, and nickel. A size of the nano antenna corresponds to a specific optical band, and the nano antenna can absorb light whose wavelength is within the optical band. A nano gap is formed between the first part and the second part of the nano antenna. The nano gap has a nano size. There may be an insulator, such as a gas or a polymer material, at the nano gap. A metal-insulator-metal (MIM) diode is formed at the nano gap. To be specific, a structure formed by an end of the first part of the nano antenna, the nano gap, and an end of the second part of the nano antenna has a function of a MIM diode. Under a light condition, electrons on a metal surface collectively oscillate under an action of an external magnetic field to generate a high-frequency alternating current. The MIM diode serves as a rectifier to convert the high-frequency alternating current into a direct current. An enhanced light field is generated at the nano gap, and the MIM diode is exactly located in the enhanced light field, so that the MIM diode can fully interact with enhanced light to improve photoelectric conversion efficiency. Because an alternating current at an optical frequency needs to be processed, a diode needs to have a very high cut-off frequency. To increase the cut-off frequency, a capacitance value of the diode needs to be reduced. In this embodiment of this application, a capacitor is formed between the nano antenna and the metallic ground plane to perform a negative compensation for a capacitance value of the MIM diode, so as to reduce the capacitance value of the MIM diode.

In the nano antenna unit, an electrode line of the nano antenna is arranged at a location, close to the nano gap, of each metal part of the nano antenna. The MIM diode converts an alternating current into a direct current. Because the metal part of the nano antenna has a relatively large resistance, the electrode line of the nano antenna may be arranged at a location close to the MIM diode to reduce a current loss in the metal part, thereby improving photoelectric conversion efficiency.

The substrate unit cell is located between the metallic ground plane and the nano antenna unit. The substrate unit cell is made of a dielectric material with a specific parameter. The dielectric material may be silicon, silicon carbide, silicon oxide, silicon dioxide, or the like. This is not limited herein in this embodiment of this application. The parameter includes a thickness and a dielectric constant. The parameter corresponds to an optical band corresponding to a nano antenna at a location on the substrate unit cell. For example, if the substrate unit cell has one nano antenna, the parameter of the substrate unit cell corresponds to an optical band corresponding to the nano antenna; or when the substrate unit cell has a plurality of nano antennas, within a range of each nano antenna, a parameter of the substrate unit cell at this location corresponds to an optical band corresponding to the nano antenna. When light is irradiated to a surface of the nano antenna, some light waves pass through the nano antenna and cannot be fully absorbed by the nano antenna.

In this embodiment of this application, the light waves that pass through the nano antenna are reflected back to the nano antenna by the substrate unit cell with a specific parameter, thereby improving light absorption efficiency of the nano antenna.

The packaging unit is located at a top layer of the entire pixel structure and covers the nano antenna. The packaging unit may be made of a transparent dielectric material, for example, glass. This is not limited herein in this embodiment of this application.

A light wavelength corresponding to the pixel structure is related to geometry of the nano antenna. Theoretically, a geometric shape of the nano antenna may vary. However, in practical production, considering that the nano antenna needs to be processed in a nano size, the geometric shape of the nano antenna should be as simple as possible; otherwise, the processing is difficult.

Figure 5:
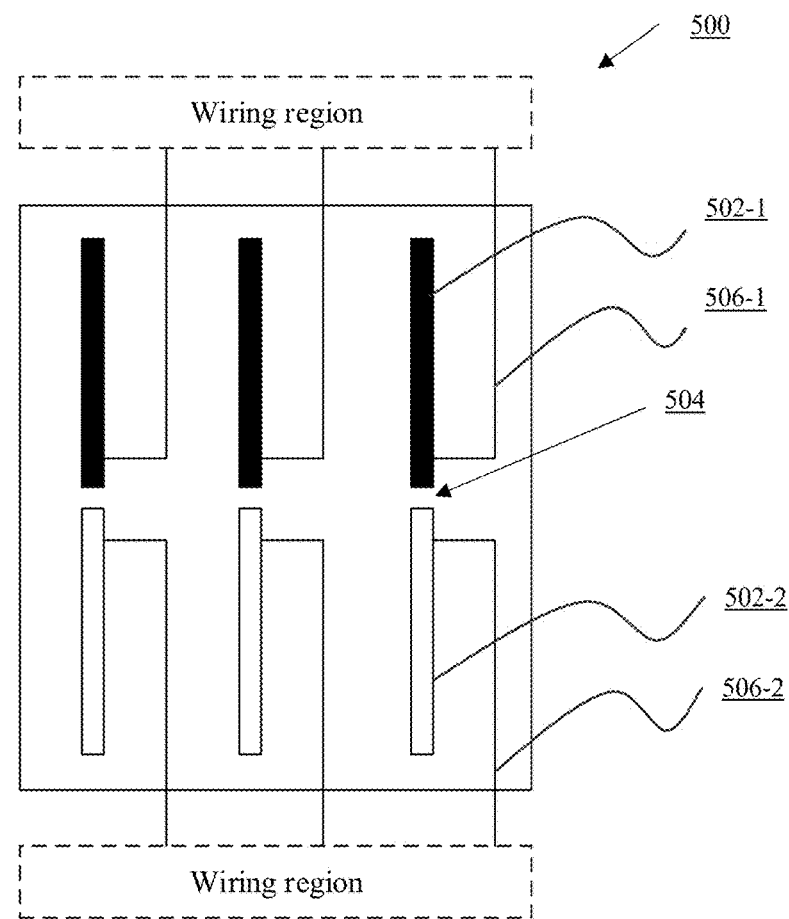
FIG. 5 is a schematic diagram of a first nano antenna structure according to an embodiment of this application.

FIG. 5 is a schematic diagram of a first nano antenna structure 500 according to an embodiment of this application.

As shown in FIG. 5, one pixel structure may include a plurality of nano antennas, and the plurality of nano antennas are all disposed on a substrate unit cell in parallel to the substrate unit cell. For example, there are three nano antennas. Each nano antenna includes two parts. The two parts constitute an antenna pair, such as antenna pair 502-1 and 502-2, each nano antenna of the antenna pair is connected to a wiring region via an electrode line, such as electrode lines 506-1 and 506-2. The antenna pair is arranged in a linear shape. A nano gap 504 is formed between the two parts of the nano antenna. The nano gap has a nano size. A specific size of the gap is not limited in this embodiment of this application. Both parts of the nano antenna are in a strip shape. A wavelength of light absorbed by the nano antenna is determined by a length of the strip shape. Lengths of the three nano antennas in the pixel structure may be the same, or lengths of two of the nano antennas are the same, or lengths of the three nano antennas are different. For example, if the lengths of the three nano antennas are different, photoelectric conversion can be simultaneously performed on light with a plurality of selected wavelengths. Correspondingly, the pixel structure may correspond to light in three different colors. Optionally, a parameter of the substrate unit cell in the pixel structure may correspond to an optical band corresponding to any one of the three nano antennas.

Figure 6:
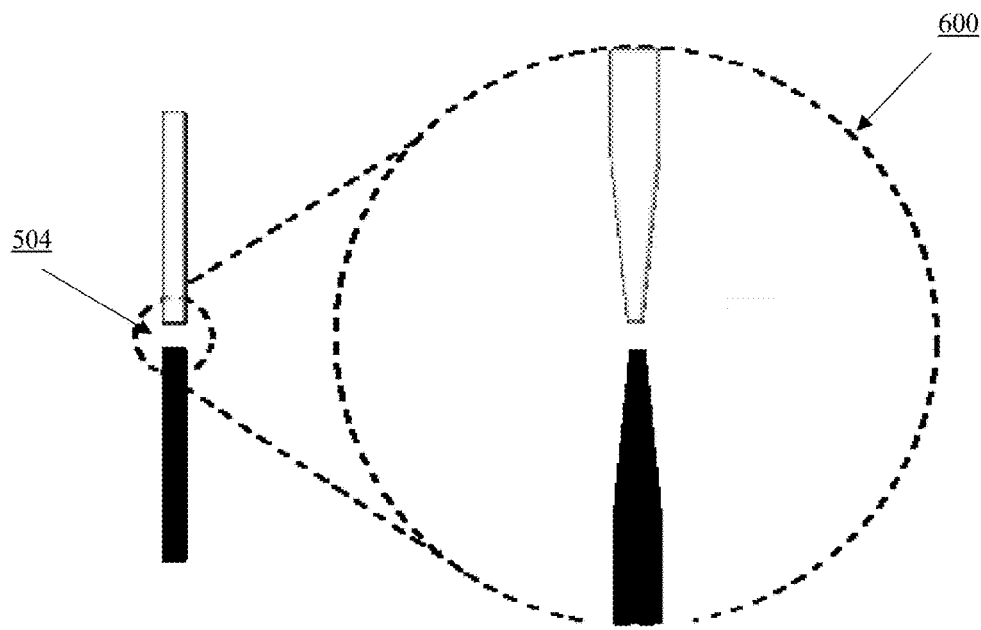
FIG. 6 is a partial enlarged view of a nano antenna at a nano gap according to an embodiment of this application.

FIG. 6 is a partial enlarged view 600 of a nano antenna at a nano gap (e.g., nano gap 504 of FIG. 5) according to an embodiment of this application. It can be learned from FIG. 6 that a width of each part of the nano antenna progressively decreases from a location away from the nano gap to a location close to the nano gap. To increase a cut-off frequency of a MIM diode, a capacitance value of the MIM diode needs to be reduced. Therefore, a width of a metal antenna around the MIM diode may be reduced to achieve an effect of reducing the capacitance value of the MIM diode.

Figure 7:
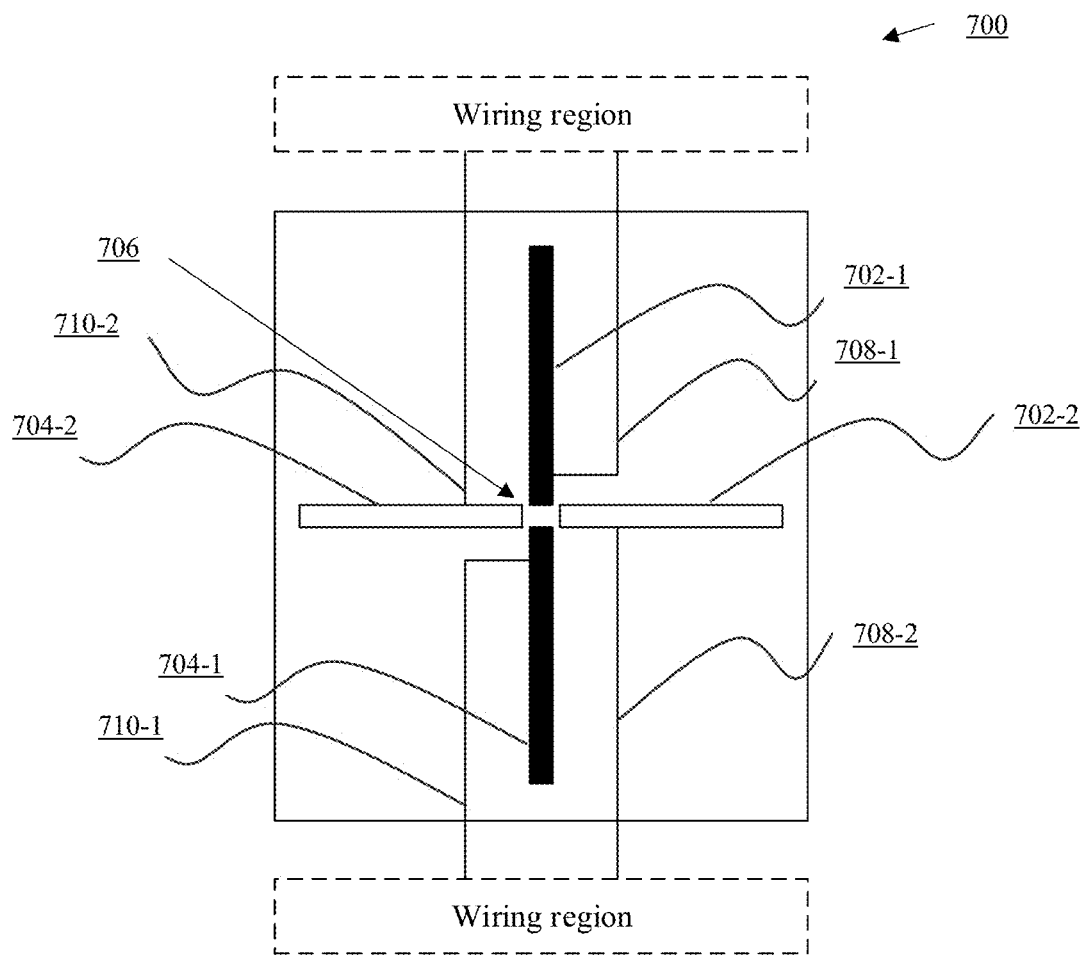
FIG. 7 is a schematic diagram of a second nano antenna structure according to an embodiment of this application.

FIG. 7 is a schematic diagram of a second nano antenna structure 700 according to an embodiment of this application.

As shown in FIG. 7, the nano antenna includes four parts, and the four parts are disposed on a substrate unit cell in parallel to the substrate unit cell. Two adjacent parts form an antenna pair, such as exemplary pairs 702-1 and 702-2 and pair 704-1 and 704-2, each nano antenna of the antenna pair is connected to a wiring region via an electrode line, such as electrode lines 708-1, 708-2, 710-1, and 710-2, and the two adjacent parts have different work functions, that is, two parts of each antenna pair have different work functions. Each part and a part facing the part may have a same work function or different work functions. This is not limited herein in this embodiment of this application. The nano antenna is in a cross shape. Two parts of each antenna pair form a nano gap 706 at a center of the cross shape. Each antenna pair and another antenna pair also form a nano-sized gap at the center of the cross shape. A size of the gap is not limited in this embodiment of this application.

Theoretically, an optimal antenna shape should follow a polarization direction of a light wave. However, light in nature is polarized in random directions. However, light can always be decomposed into two polarization components along an x direction and a y direction regardless of a polarization direction. With the cross-shaped antenna shown in FIG. 7, light waves polarized in random directions can be decomposed into components along different parts of the antenna, so that the cross-shaped antenna can perform photoelectric conversion on the light waves in random polarization directions.

Figure 8:
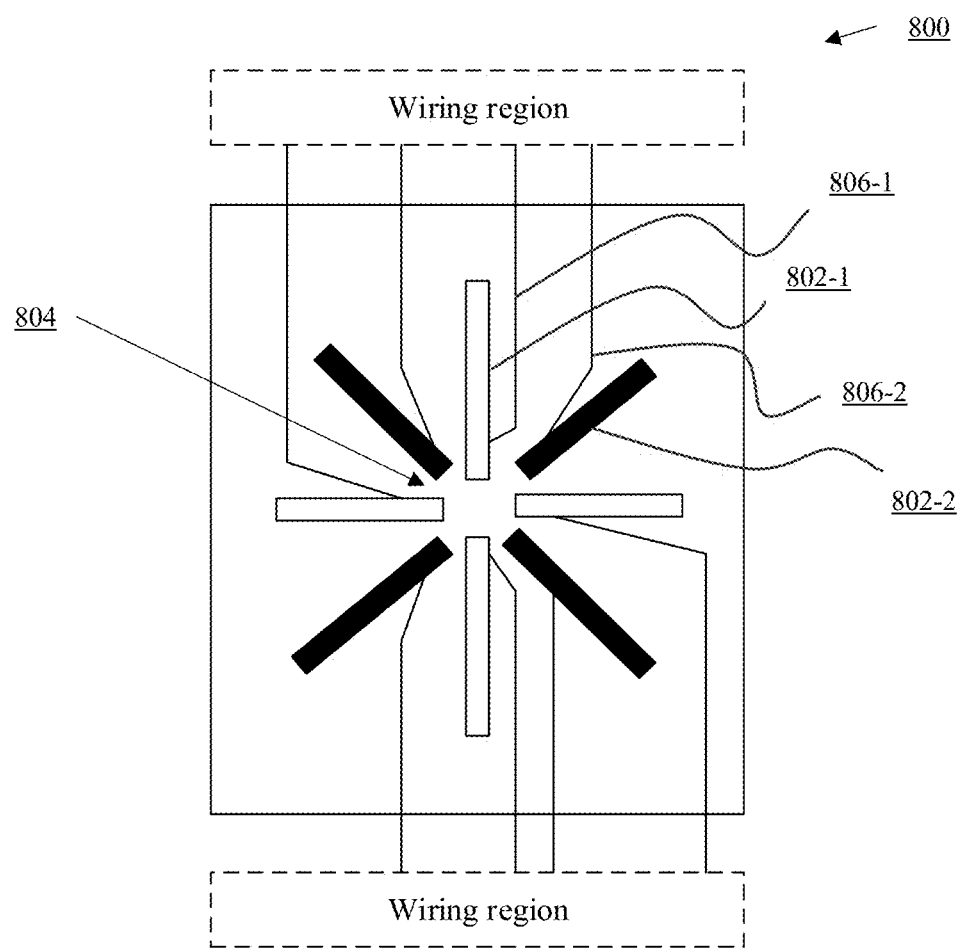
FIG. 8 is a schematic diagram of a third nano antenna structure according to an embodiment of this application.

FIG. 8 is a schematic diagram of a third nano antenna structure 800 according to an embodiment of this application.

As shown in FIG. 8, the nano antenna includes eight parts, such as example parts 802-1 and 802-2, and the eight parts are disposed on a substrate unit cell in parallel to the substrate unit cell. Two adjacent parts, such as example parts 802-1 and 802-2 form an antenna pair, and the two adjacent parts have different work functions, that is, two parts of each antenna pair have different work functions and are connected to a wiring region via an electrode line, such as electrode lines 806-1 and 806-2. Each part and a part facing the part or a part not facing the part may have a same work function or different work functions. This is not limited herein in this embodiment of this application. The nano antenna is in a double-cross shape. Two parts of each antenna pair form a nano gap 804 at a center of the double-cross shape. Each antenna pair and another antenna pair also form a nano-sized gap at the center of the double-cross shape. A size of the gap is not limited in this embodiment of this application.

If the antenna in FIG. 8 is in a cross shape, polarized light whose polarization directions are between two parts of an antenna pair may be decomposed along two parts that are perpendicular to each other. If the antenna in FIG. 8 is in a double-cross shape, for example, if an included angle between two parts of an antenna pair is 45 degrees, polarized light within the included angle of 45 degrees may be decomposed along the two parts of the antenna pair, but polarized light in a direction beyond the 45 degrees does not need to be decomposed, thereby increasing a photoelectric conversion rate.

Figure 9:
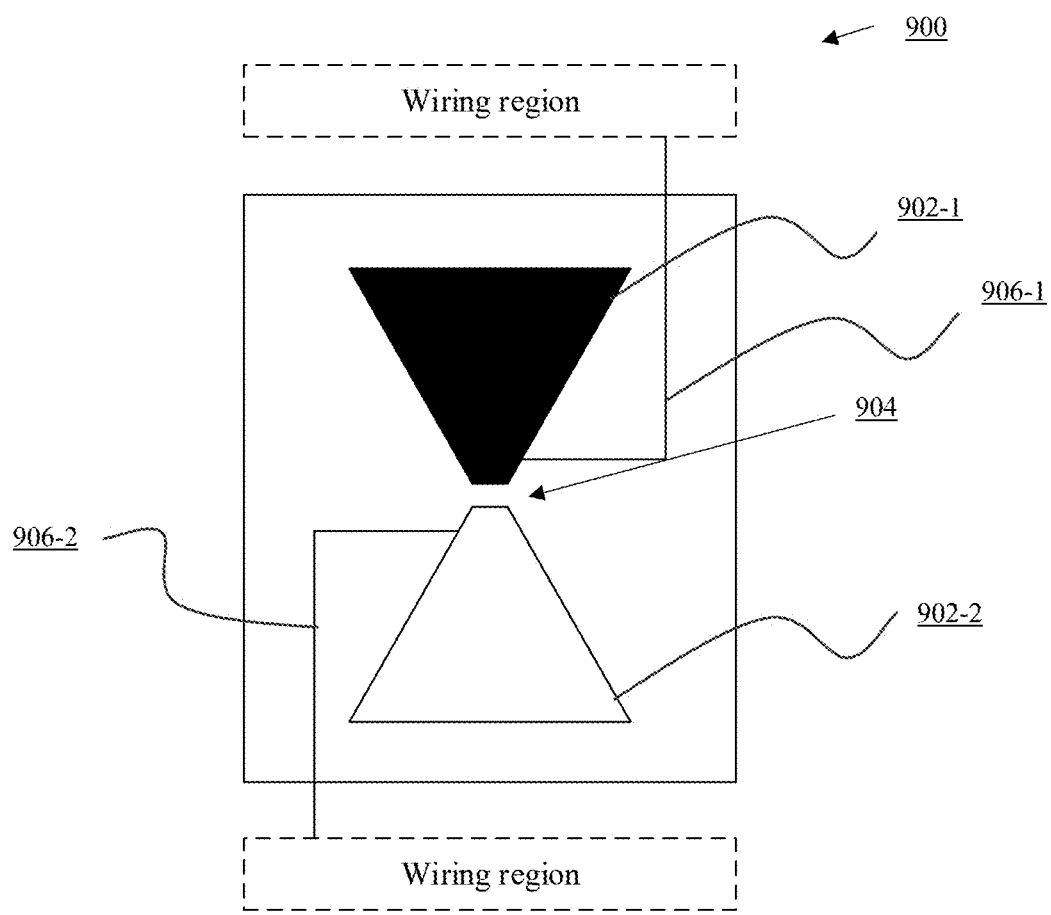
FIG. 9 is a schematic diagram of a fourth nano antenna structure according to an embodiment of this application.

FIG. 9 is a schematic diagram of a fourth nano antenna structure 900 according to an embodiment of this application.

As shown in FIG. 9, the nano antenna includes two parts, such as parts 902-1 and 902-2 and the two parts are disposed on a substrate unit cell in parallel to the substrate unit cell. The two parts of the nano antenna have different work functions. Both parts of the nano antenna are in a trapezoidal shape and each part is connected to a wiring region via an electrode line, such as electrode lines 906-1 and 906-2. The two trapezoids are arranged with their shortest bases facing each other, and a nano gap 904 is formed at the two bases that face each other. A specific shape of the trapezoid is not limited in this embodiment of this application.

A trapezoid in a lower part of FIG. 9 is used as an example for description. For any points on a lateral side of the trapezoid, distances from the points to a long base of the trapezoid continuously and successively change. In other words, it may be considered that lengths of the nano antenna continuously and successively change. Therefore, the nano antenna can perform photoelectric conversion on light waves within a continuous wavelength range, thereby expanding a range of photoelectric conversion performed by the nano antenna.

Optionally, bases of the two parts of the nano antenna at the nano gap may be alternatively in an arc shape protruding toward the nano gap.

Figure 10:
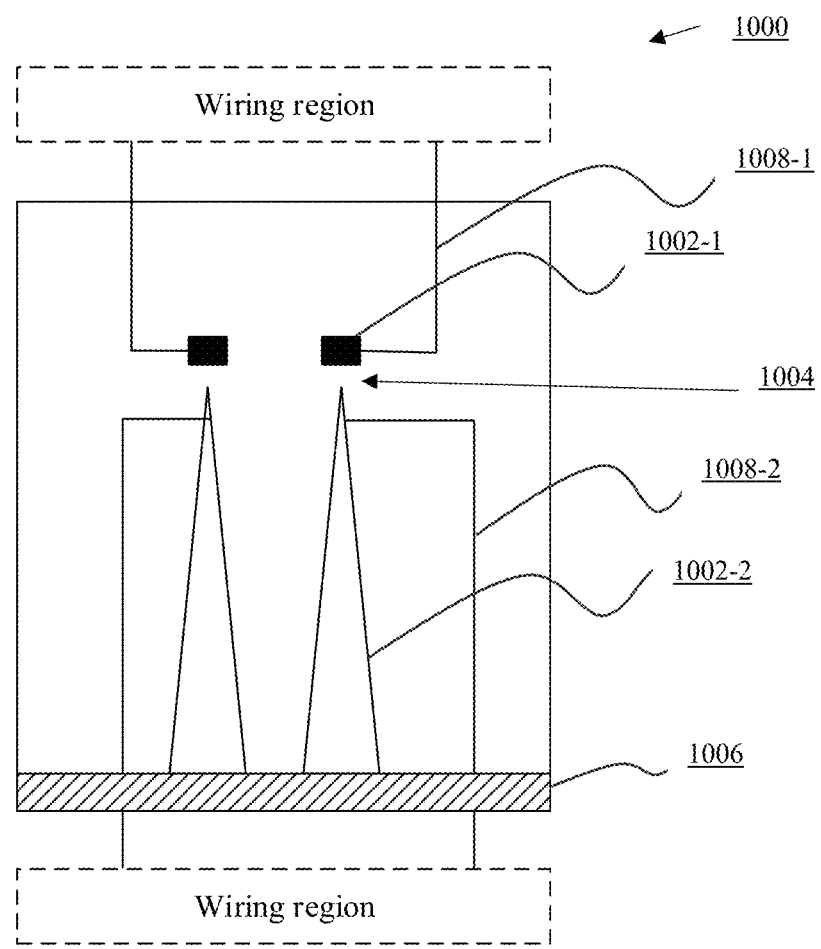
FIG. 10 is a schematic diagram of a fifth nano antenna structure according to an embodiment of this application.

FIG. 10 is a schematic diagram of a fifth nano antenna structure 1000 according to an embodiment of this application.

As shown in FIG. 10, the pixel structure includes two nano antennas. Each nano antenna includes two parts, such as parts 1002-1 and 1002-2, each connected to a wiring region via an electrode line, such as electrode lines 1008-1 and 1008-2. One of the two parts (a lower part for short, and an example illustrated as 1002-2) is disposed on a substrate unit cell 1006 with its long side perpendicular to the substrate unit cell. The other of the two parts (an upper part for short, and an example illustrated as 1002-1) is arranged facing the lower part, and is disposed above the lower part. The upper part may be fastened to the lower part by using a bracket or in another manner. This is not limited in this embodiment of this application. A nano gap 1004 is formed between the upper part and the lower part. In this embodiment of this application, the lower part is in a cone shape, and has a size greater than that of the upper part. A specific shape of the upper part is not limited in this embodiment of this application.

In FIG. 10, the lower part of the nano antenna is disposed on the substrate unit cell with its long side perpendicular to the substrate unit cell, thereby reducing an area occupied on the substrate unit cell. Therefore, a plurality of nano antennas in FIG. 10 may be disposed on the substrate unit cell to increase antenna density. Optionally, all of the plurality of nano antennas may have different sizes, thereby expanding a range of photoelectric conversion.

Based on the foregoing description of the implementations, a person skilled in the art may understand that for the purpose of convenient and brief description, division into the foregoing functional modules is merely used as an example for description. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in another manner. For example, division into the modules or units is merely logical function division. There may be another division manner in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A pixel structure, comprising:
   a metallic ground plane;
   a substrate unit cell, wherein the substrate unit cell is located on the metallic ground plane;
   a nano antenna unit, wherein the nano antenna unit is located on the substrate unit cell, and comprises one or more nano antennas, wherein each of the one or more nano antennas corresponds to one optical band, and comprises M parts, wherein a nano gap is formed between the M parts, wherein the M parts and the nano gap have a function of a metal-insulator-metal diode, wherein M is a multiple of 2, and wherein each of the M parts and a part adjacent to the part have different work functions; and
   a packaging unit, wherein the packaging unit covers the nano antenna unit.

2. The pixel structure according to claim 1, wherein each of the M parts and a part adjacent to the part are different metals in a same shape, a same metal in different shapes, or different metals in different shapes.

3. The pixel structure according to claim 1, wherein a width of each of the M parts progressively decreases from a first location to a second location, wherein the first location is further away from the nano gap than the second location.

4. The pixel structure according to claim 1, wherein a parameter of the substrate unit cell at a location of each nano antenna corresponds to an optical band corresponding to the nano antenna, and the parameter of the substrate unit cell comprises a thickness and a dielectric constant.

5. The pixel structure according to claim 1, wherein the nano antenna comprises N antenna pairs, each of the N antenna pairs comprising two parts with a nano gap in between, wherein the N antenna pairs are parallel to the substrate unit cell, and are radically arranged in one of a linear shape, a cross shape, and a double-cross shape, and wherein N is an integer greater than or equal to 1.

6. The pixel structure according to claim 5, wherein each part of the N antenna pairs is in a strip shape.

7. The pixel structure according to claim 1, wherein the nano antenna comprises two parts with a nano gap in between, wherein the two parts are arranged in a bow-tie shape and are parallel to the substrate unit cell, wherein each of the two parts is a trapezoid in shape, and wherein the two trapezoids are arranged with shorter bases facing each other.

8. The pixel structure according to claim 1, wherein the nano antenna comprises two parts with a nano gap in between, wherein a first part of the two parts is vertically disposed on the substrate unit cell, and a second part of the two parts is arranged facing the first part.

9. The pixel structure according to claim 8, wherein the first part is a cone in shape, and is greater than the second part in size.

10. The pixel structure according to claim 1, wherein an electrode line of the nano antenna is arranged at a location of each of the M parts, wherein the location is at a predetermined distance to the nano gap.

11. An image sensor, comprising:
a plurality of pixel structures;
wherein each of the plurality of pixel structures comprises:
a metallic ground plane;
a substrate unit cell, wherein the substrate unit cell is located on the metallic ground plane;
a nano antenna unit, wherein the nano antenna unit is located on the substrate unit cell, and comprises one or more nano antennas, wherein each of the one or more nano antennas corresponds to one optical band, and comprises M parts, wherein a nano gap is formed between the M parts, wherein the M parts and the nano gap have a function of a metal-insulator-metal diode, and wherein M is a multiple of 2; and
a packaging unit, wherein the packaging unit covers the nano antenna unit.

12. The image sensor of according to claim 11, wherein each of the M parts and a part adjacent to the part have different work functions.

13. The image sensor of according to claim 11, wherein each of the M parts and a part adjacent to the part are different metals in a same shape, a same metal in different shapes, or different metals in different shapes.

14. The image sensor of according to claim 11, wherein a width of each of the M parts progressively decreases from a fist location to a second location, wherein the first location is further away from the nano gap than the second location.

15. The image sensor of according to claim 11, wherein a parameter of the substrate unit cell at a location of each nano antenna corresponds to an optical band corresponding to the nano antenna, and the parameter of the substrate unit cell comprises a thickness and a dielectric constant.

16. The image sensor of according to claim 11, wherein the nano antenna comprises N antenna pairs, each of the N antenna pairs comprising two parts with a nano gap in between, wherein the N antenna pairs are parallel to the substrate unit cell, and are radically arranged in one of a linear shape, a cross shape, and a double-cross shape, and wherein N is an integer greater than or equal to 1.

17. The image sensor of according to claim 16, wherein each part of the N antenna pairs is in a strip shape.

18. The image sensor of according to claim 11, wherein the nano antenna comprises two parts with a nano gap in between, wherein the two parts are arranged in a bow-tie shape and are parallel to the substrate unit cell, wherein each of the two parts is a trapezoid in shape, and wherein the two trapezoids are arranged with shorter bases facing each other.

19. An electronic product, comprising an image sensor, wherein the image sensor comprises:
a plurality of pixel structures;
wherein each of the plurality of pixel structures comprise:
a metallic ground plane;
a substrate unit cell, wherein the substrate unit cell is located on the metallic ground plane;
a nano antenna unit, wherein the nano antenna unit is located on the substrate unit cell, and comprises one or more nano antennas, wherein each of the one or more nano antennas corresponds to one optical band, and comprises M parts, wherein a nano gap is formed between the M parts, wherein the M parts and the nano gap have a function of a metal-insulator-metal diode, and wherein M is a multiple of 2; and
a packaging unit, wherein the packaging unit covers the nano antenna unit.

* * * * *